(No Model.)
H. DOOLITTLE.
HARROW.
No. 283,083. Patented Aug. 14, 1883.
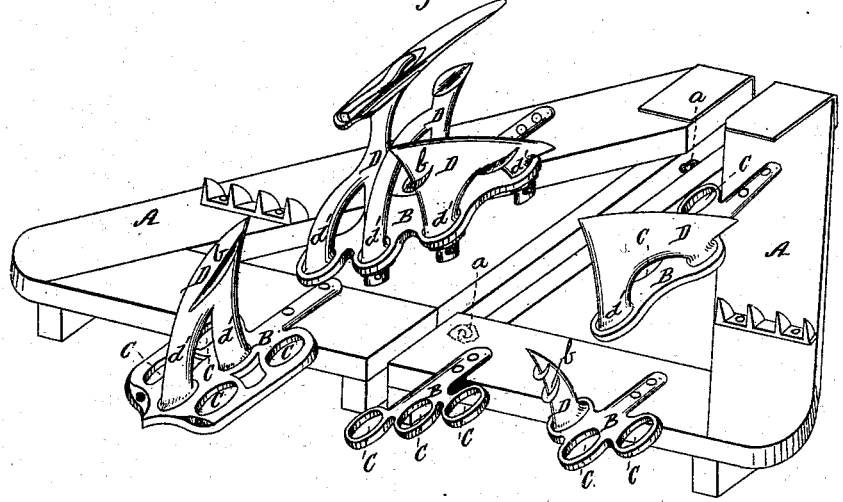
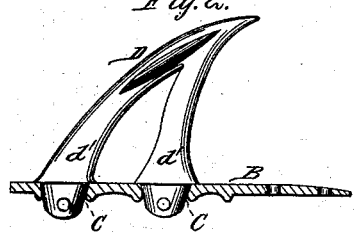
Witnesses:
W. C. Jordiston
Fred P. Church.
Inventor:
Harrison Doolittle
by
H. S. Abbot
his Attorney.

UNITED STATES PATENT OFFICE.

HARRISON DOOLITTLE, OF PLAIN CITY, OHIO.

HARROW.

SPECIFICATION forming part of Letters Patent No. 283,083, dated August 14, 1883.

Application filed November 10, 1882. (No model.)

*To all whom it may concern:*

Be it known that I, HARRISON DOOLITTLE, a citizen of the United States of America, residing at Plain City, in the county of Madison and State of Ohio, have invented certain new and useful Improvements in Harrows; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, in which—

Figure 1 is a perspective of the harrow in a reversed position, showing the castings attached and the various forms of teeth, some of the teeth being removed to show slots in castings; Fig. 2, a sectional view of one of the castings, showing how the teeth are attached and held in place.

My invention has for its object to provide a harrow or cultivator which is composed of several metal sections or castings secured in any suitable manner to a main frame, the teeth of which can be readily adjusted or removed, and which has several varieties of teeth to accommodate the various uses to which said harrow or cultivator can be put, and which, by the arrangement of the various parts, can be made larger or smaller, as desired. Thus, when rough ground is to be broken up the entire harrow is used, and in cultivating corn only a portion of said harrow is used, and in which the said sections or castings, to which the teeth are secured, are adjusted separately, so that in case of breakage only the broken casting has to be replaced, and in which the sections or castings can be removed from the harrow-body and used for various purposes—as where a small cultivator is desired, for gardening purposes, one of said sections can be bolted to a handle and used in that manner.

Referring to the drawings, A is the harrow body or frame, formed in two sections, hinged together by hinges *a a*.

B B B B are metal castings or sections, attached in any suitable manner to the harrow-body A, and having the holes or slots C in said castings, through which slots the shanks of the teeth project and are secured to said castings.

D are the teeth of the harrow, having shanks *d'*, and are adjusted by passing the shanks through the slots or sockets, and are held in place by pins inserted in eyes formed in the end of said shanks. The shanks of said teeth can thus be shifted from slot to slot.

The teeth D are of various descriptions, and may have two shanks, as shown in Figs. 1 and 2, and any kind of tooth can be inserted to suit the purpose for which said harrow is to be used. Some of said teeth are provided with sharp flanged projections *b*, forming side cutters, which are cast with the teeth, and are used when the soil is hard and dry, by means of which arrangement of castings and teeth any one of said castings B can be removed and replaced in case of breakage without replacing the entire set of castings.

Having thus fully described my invention, I claim as new and desire to secure by Letters Patent—

In a harrow, the combination of the frame A with the metal castings B, having the sockets C, and the adjustable teeth fitting in said sockets, substantially as and for the purpose shown and described.

In testimony whereof I affix my signature in presence of two witnesses.

HARRISON DOOLITTLE.

Witnesses:
 M. W. HORN,
 W. R. SHERWOOD.